July 27, 1965 W. RAYVE 3,197,103
LOOP SENSING SWITCH
Filed May 20, 1963
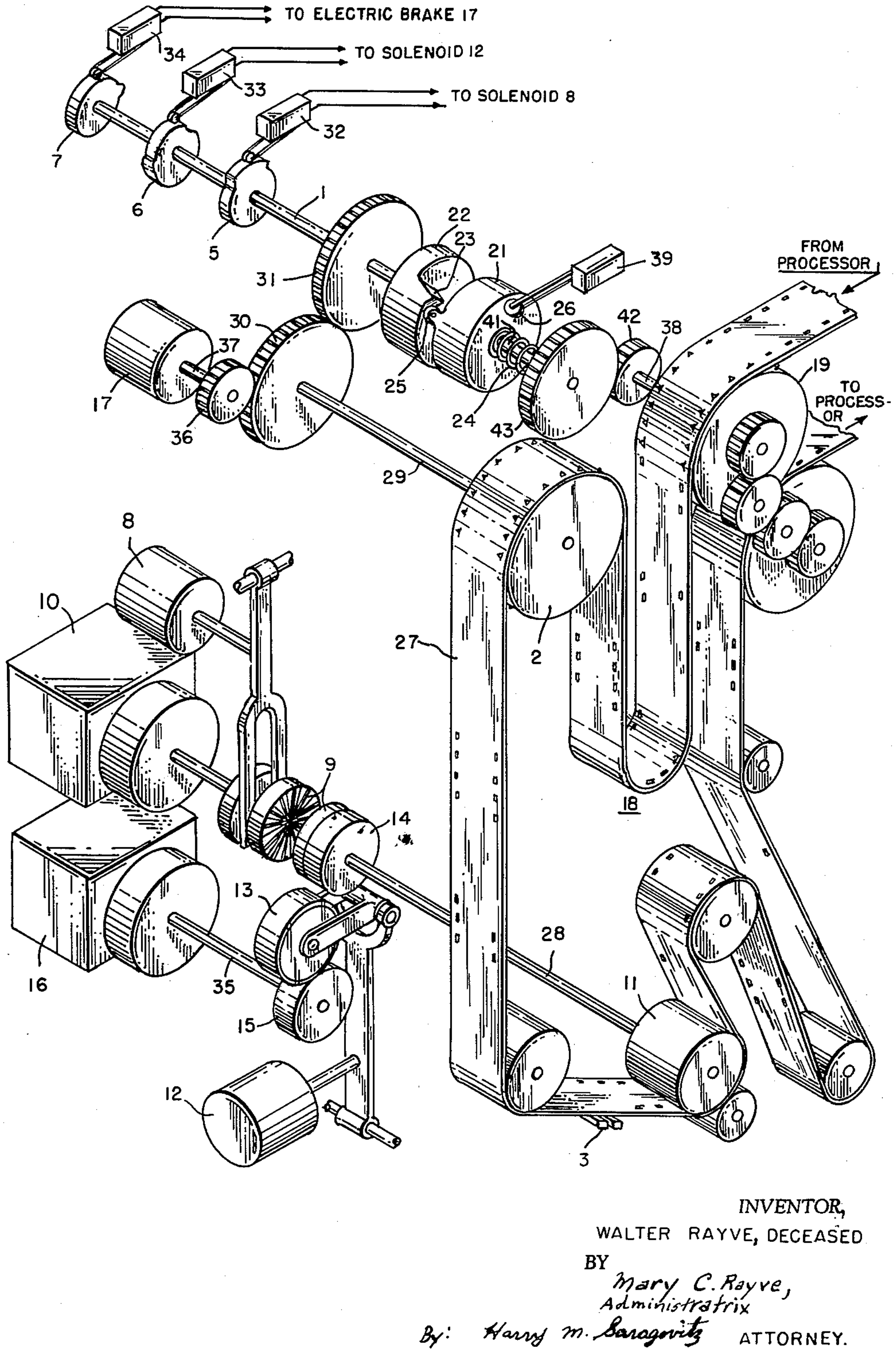
INVENTOR,
WALTER RAYVE, DECEASED
BY Mary C. Rayve,
Administratrix
By: Harry M. Saragovitz ATTORNEY.

3,197,103

LOOP SENSING SWITCH

Walter Rayve, deceased, late of East Meadow, N.Y., by Mary C. Rayve, administratrix, East Meadow, N.Y., assignor to the United States of America as represented by the Secretary of the Army Filed May 20, 1963, Ser. No. 281,849
3 Claims. (Cl. 226—37)

This invention relates to apparatus for sensing the size of a loop of film and more particularly to loop sensing apparatus which is used in conjunction with a film scanner in such a manner that a scanning cycle will not commence until there is sufficient film available in the loop to complete a full cycle.

An object of this invention is to provide a novel loop sensing apparatus.

Another object of this invention is to provide a loop sensing switch which is of simple design and which comprises fewer moving parts than prior conventional loop sensing devices.

A further object of this invention is to provide apparatus for determining when a loop of film is of a predetermined size by comparing the relative rotation of the sprockets on the input and output ends of the loop.

Briefly the above objects are accomplished as follows: The scanner must start scanning at the beginning of a frame and stop at the end of a frame, while scanning three frames per cycle, for example. Since scan speed must be accurately maintained during scanning, it is necessary to determine prior to scanning that there is sufficient film in the scanner so that the operation may continue until an entire cycle is completed. The film is fed to the scanner from a processor. Since it is not feasible to establish a processing speed precisely equal to the average speed of one cycle of the scanning operation and since having a processor speed greater than the average scanner speed would result in a constantly increasing surplus of film between the processor and the scanner units it is necessary for the processor speed to be slightly less than the average scanner speed. As the film is fed into the scanner unit from the processor and the film in the scanner is stopped after the end of a cycle, a loop of film begins to build up in the scanner. The size of this loop is mechanically determined by two coaxial cams, one rotating at the speed of the film in the processor unit and one rotating at the speed of the film in the scanner. When a loop of sufficient size is accumulated, a scanning cycle will be initiated.

These and other objects and advantages of this invention will become apparent from the detailed description of the invention given in connection with the drawing in which the figure is a diagrammatic representation of the invention.

In the drawing a film band 27 being received from a film processor (not shown) is moved past a scanning slit 3. At the scanning slit a sampling of the film is observed while traversing the slit at a slow rate of speed to ascertain the extent to which the processing of the film has been completed. The particular portion of film, which is to be sampled at the scanning slit, is determined by the cycle timing mechanism of this invention.

The timing mechanism includes a cam shaft 1 which rotates at the rate of one revolution per cycle. For the purpose of this description it will be assumed that three frames of film traverse the scanning slit during one cycle. A film metering roller 11 which is mounted on a shaft 28 pulls the film past scanning slit 3. A sprocket 2, which is mounted on a shaft 29, engages the film prior to the film's passage over the scanning slit, and the motion imparted to the sprocket 2 by the moving film is subsequently geared down from the sprocket 2 to the cam shaft 1 through gears 30 and 31. The cam shaft contains a scan cam 5, a slew cam 6 and a brake cam 7. Cams 5, 6 and 7 are positioned adjacent to microswitches 32, 22 and 34 respectively so that the switches are sequentially actuated by the raised portion of their adjacent cams. By actuating switch 32 the scan cam controls the actuation of the scan solenoid 8 which drives a jaw clutch 9 from a disengaged to an engaged position and thereby makes and breaks a mechanical connection between the scan drive motor-spiroid gear package 10, which has a correct output speed for proper scanning, and the film metering roller 11 which pulls the film past the scanning slit. The slew cam 6 actuates microswitch 33 which controls the energization of a slew solenoid 12. When solenoid 12 is actuated, a rubber surfaced puck 13 is forced between a steel puck 14, which is mounted on shaft 28, and a steel puck 15 which is mounted on a shaft 35 of a slew drive motor-spur gear package 16. Shaft 35 is rotated at a speed that is necessary for the much faster slewing operation. The brake cam 7 actuates microswitch 34 which controls the energization of an electric brake 17 which is coupled to sprocket 2 through a reduction gearing arrangement of gears 36 and 30 which are mounted on shafts 37 and 29 respectively.

In a typical cycle, it may be desired to pass a single frame past the scanning slit at scanning speed and then to pass the next two frames at slew speed to complete a scan-slew cycle. To accomplish this, the scan cam 5 actuates switch 32 for one-third of its periphery which corresponds to one frame of film movement. Then the slew cam 6 actuates switch 33 for just short of two-thirds of its periphery which corresponds to slightly less than two frames of film movement. Then switch 34 is actuated by brake cam 7 to bring the film to a stop at the end of one complete rotation of the cam shaft 1 and the system is ready for the next cycle. If it is desired to operate the scanner in the continuous scan mode, that is, with the film driven only at scan speed, the slew cam 6 and the brake cam 7 are electronically disabled and the scan drive circuit is energized for an entire rotation of the cam shaft and consequently a cycle of three scanned frames is run off. At the end of either a scan-slew cycle or a continuous scan cycle, a new cycle will not commence until there is indication that there is sufficient film in the scanner to run an entire cycle. This indication is accomplished automatically as described below.

To transmit intelligible information the scanner is required to commence scanning at the start of a frame and to conclude scanning at the end of a frame so as to avoid transmission of mere segments of frames. Since scan speed must be accurately maintained during scanning, it is thus necessary to determine, prior to scanning, that there is sufficient film in the scanner for the operation to continue until an entire continuous scan or scan-slew cycle has been completed. Since it would not be feasible to establish a processing speed precisely equal to the average speed of a scan-slew cycle, and since having a processor speed greater than average scanner speed would result in a constantly increasing surplus of film between the processor and the scanner units, it is necessary to establish a processor speed which is slightly slower than the average scanner speed. Therefore, the scanner must wait briefly after each cycle for more film.

A specific example will now be considered which is not intended to limit this invention but is given only to assist in the description thereof. The scanner speed during a continuous scan cycle is the speed of scanning itself, .297 inches per second. For this mode a processor speed of .2965 inches per second has been established. Average scanner speed during a scan-slew cycle is .876 inches per second and a processor speed of .874 inches per second has been established for this mode. To determine that sufficient film has arrived in the scanner unit from the processor unit, the film awaiting scanning is formed into a loop 18 between two sprocket rollers. The first sprocket roller 19 encountered by the film is mounted on shaft 38 and is driven by the processor and thus rotates at processor speed. The second sprocket roller 2 is driven by film passing over the film metering roller 11 and therefore it rotates at actual scanner film speed. The film in the loop 18 represents the amount of film available for running off a scanning cycle and is measured indirectly by measuring the relative motions of sprockets 2 and 19 with respect to each other.

The film is initially threaded into a loop of known size. If both sprockets were observed during operation of the system to rotate at the same speed it would be known that the loop size was not changing. If the sprocket feeding into the loop rotated more quickly than the sprocket feeding out of the loop, it would be known that the loop was increasing. The mechanism of this invention operates in the latter mentioned manner. To enable the scanner to make use of this information the rotation of sprocket 19 is transmitted through a pair of gears 42 and 43 to a cam 21. Gear 42 is integrally mounted on the shaft 38, and gear 43 is integrally mounted on a shaft 41. Due to the gearing down of gears 42 and 43 cam 21 rotates at the rate of one revolution per three frame of film leaving the processor. The same arrangement exists for the sprocket 2 and therefore a cam 22 to which it is geared rotates at the rate of one revolution per three frames of film passing the scanning slit. Cams 21 and 22 are mounted co-axially and rotate independently of each other. Cam 22 is contoured on the face adjacent to the cam 21. Cam 21 is free to move axially along shaft 41 but must rotate with this shaft. Cam 21 is held against cam 22 by a spring 24. A follower 25 on cam 21 is so positioned that it follows the contour on cam 22 as the two cams move relative to each other. The contoured cam 22 has two levels and a short transitional ramp 23 between the two levels. Cam 21 therefore axially positions itself at either of the two levels, on the ramp, or at some position in between depending on the relative positions of the two cams with respect to each other. A microswitch actuator 26 rides on the cam 21 on the face opposite the follower 25. The microswitch contact of switch 39 closes when cam 21 moves axially towards cam 22.

If the film initially placed in the loop 18 when the film is threaded is made sufficient to start a scanning cycle, and if, when the film is so threaded, the follower 25 is placed on the transitional ramp 23, any time the follower rides up the ramp this indicates sufficient film in the loop to start a scanning cycle and the microswitch latches in a relay (not shown) to start the cycle. During the scan-slew cycle, since the scan speed is below processor film speed, the follower 25 will continue to ride up the ramp 23 of the contoured cam 22 and then along the upper level until the slew 2) part of the cycle is reached at which time the contoured cam 22 will race ahead of the follower cam 21 and, relatively, the follower will back track and ride down the ramp 23 onto the lower level. The scan-slew cycle will then complete itself and the contoured cam will stop. The follower on cam 21, which is still responding to the motion of the sprocket 19, will move towards the ramp and as it rides up the ramp, will again signal the microswitch that a quantity of film equal to the amount initially threaded into the loop 18 has been restored. During a continuous scan cycle, scan speed is faster than processor film speed so that as soon as the microswitch contact is closed and the scan latching relay is latched in, the follower 25 immediately drops down the ramp 23 to the lower level and continues to move along the lower level away from the ramp until the conclusion of the cycle at which time the contoured cam stops and the follower moves again towards and then up the ramp to signal that the loop has been restored to its initially threaded length.

It is to be noted that the loop sensing mechanism has been constructed integral with the cycle timing mechanism. By so integrating the mechanisms it is assured that when the loop sensing mechanism indicates that a cycle should commence, the three timing cams will be aligned with respect to the respective followers as to properly initiate the timing cycle.

What is claimed is:

1. In an apparatus for automatically scanning processed film, a loop sensing switch comprising: a scanning slit; a strip of processed film; a first sprocket rotating at a constant speed for feeding film into a loop; a second sprocket; drive means for pulling said film from said loop, over said second sprocket, and over said scanning slit, thereby rotating said second sprocket; a cam shaft; a cylindrical cam fixedly mounted on said shaft and having a cam face on one end thereof; a second shaft; a cylindrical member having a cam follower on one end thereof, said cylindrical member being slidably mounted on said second shaft with its follower end adjacent said cam face; springs mounted on said second shaft for biasing said follower onto said cam face; switch means positioned adjacent the end of said cylindrical member opposite said cam follower end for energizing said drive means; first gear means connected between said first sprocket and said cylindrical member; and second gear means connected between said second sprocket and said cylindrical cam, so that the relative movement of said first and second sprockets is transmitted to said cam and follower causing said cylindrical member to actuate said switch when said loop reaches a predetermined size.

2. In an apparatus for automatically scanning processed film, a loop sensing switch comprising: a first sprocket rotating at a constant speed; a second sprocket positioned in close proximity to and parallel with said first sprocket; a strip of film passing over said sprockets and forming a loop therebetween; a first cam shaft; a cylindrical cam fixedly mounted on said first cam shaft, one end thereof having a gradually sloping portion being connected by a short transitional ramp; a second cam shaft coaxial with said first cam shaft; a cylindrical member mounted on said second shaft so that it is free to move axially but is not free to rotate, a cam follower being on the end of said cylindrical member facing said cam; spring means fixed to said shaft for biasing said cam follower onto said cam; first gear means connected between said first sprocket and said cylindrical member so that said cylindrical member rotates at the rate of one revolution for a predetermined number of frames of film passing over said first sprocket; a scanning slit; drive means for pulling said film from said loop and over said slit, sad second sprocket beng rotated thereby; second gear means connecting said second sprocket to said cylindrical cam so that said cam rotates one revolution when said predetermined number of fames of film passes said scanning slit; and switch means positioned adjacent said cylindrical member to be actuated thereby for energizing said drive means when said loop has reached a predetermined size as determined by said cam and follower.

3. A loop sensing switch comprising: a first sprocket rotating at a constant speed; a second sprocket positioned in close proximity to and parallel with said first sprocket; a strip of film passing over said sprockets and forming a loop therebetween; a first cam shaft; a cylindrical cam fixedly mounted on said first cam shaft, one end thereof having a gradually sloping portion being connected by a short transitional ramp; a second cam shaft coaxial with said first cam shaft; a cylindrical member mounted on said second shaft so that it is free to move axially but is not free to rotate, a cam follower being on the end of said cylindrical member facing said cam; spring means fixed to said shaft for biasing said cam follower onto said cam; first gear means connected between said first sprocket and said cylindrical member so that said cylindrical member rotates at the rate of one revolution for a predetermined number of frames of film passing over said first sprocket; drive means for pulling said film over said second sprocket, said second sprocket being rotated thereby; second gear means connecting said sprocket to said cylindrical cam; and switch means positioned adjacent said cylindrical member to be actuated thereby.

References Cited by the Examiner

UNITED STATES PATENTS

| | | | |
|---|---|---|---|
| 1,472,628 | 10/23 | Bonk | 226—37 |
| 1,808,551 | 6/31 | Heisler | 226—40 X |
| 1,958,152 | 5/34 | Oehmichen | 226—44 |
| 2,212,947 | 8/40 | Myer et al. | 226—43 X |
| 2,491,228 | 12/49 | Swift | 226—36 |

M. HENSON WOOD, Jr., *Primary Examiner.*

RAPHAEL M. LUPO, ROBERT B. REEVES, *Examiners.*